Figure 1:
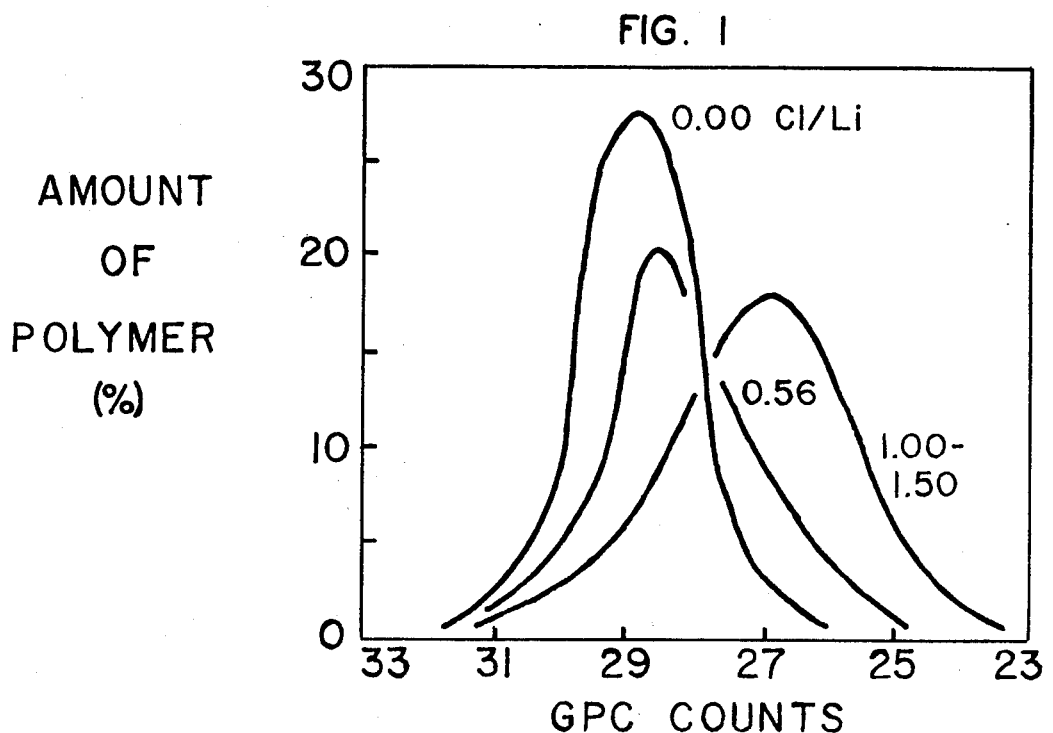

United States Patent [19]

Halasa

[11] 3,737,421

[45] June 5, 1973

[54] PROCESS OF JOINING BY MEANS OF POLYHALOGEN COMPOUNDS

[75] Inventor: Adel F. Halasa, Bath, Ohio

[73] Assignee: The Firestone Tire & Rubber Company, Akron, Ohio

[22] Filed: Feb. 2, 1971

[21] Appl. No.: 112,026

Related U.S. Application Data

[63] Continuation of Ser. No. 864,825, Oct. 8, 1969, abandoned, and a continuation-in-part of Ser. No. 575,967, Aug. 30, 1966, abandoned.

[52] U.S. Cl..........260/94.2 M, 260/80.78, 260/82.1, 260/83.7, 260/85.3, 260/85.1, 260/94.7 R
[51] Int. Cl...........C08d 5/04, C08d 3/08, C08d 3/12
[58] Field of Search................260/94.2 M, 94.7 HA, 260/94.7 R, 85.1

[56] References Cited

UNITED STATES PATENTS

| | | | |
|---|---|---|---|
| 3,078,254 | 2/1963 | Zelinski et al. | 260/45.5 |
| 3,091,653 | 5/1963 | Nogradi | 260/681.5 |
| 3,135,716 | 6/1964 | Uranech et al. | 260/45.5 |
| 3,281,383 | 10/1966 | Zelinski et al. | 260/23.7 |
| 3,318,862 | 5/1967 | Hinton | 260/94.2 |
| 3,382,225 | 5/1968 | Naylor | 260/94.3 |

FOREIGN PATENTS OR APPLICATIONS

| | | | |
|---|---|---|---|
| 992,210 | 5/1965 | Great Britain | 260/94.7 |

*Primary Examiner*—Joseph L. Schofer
*Assistant Examiner*—William F. Hammock
*Attorney*—Gordon C. Mack

[57] ABSTRACT

Molecules of low molecular weight polymers derived at least in part from a diene monomer, are joined to produce branched polymers and copolymers of increased molecular weight. The polymers which are joined are live polymers, i.e., they have one or more "live ends." The joining agents consist of, or comprise, a saturated or unsaturated, straight or branched chain or cyclo-containing aliphatic hydrocarbon which contains one to 50 or more carbon atoms and comprises three or four halogens on a terminal carbon.

6 Claims, 2 Drawing Figures

PROCESS OF JOINING BY MEANS OF POLYHALOGEN COMPOUNDS

This application is a continuation-in-part of my application Ser. No. 575,967 filed Aug. 30, 1966 (now abandoned).

The invention relates to novel branched polymers and to a novel method of making them. The term "polymer" is used herein to include both homopolymers and copolymers.

Polymers of diene monomers often are difficult to fabricate into useful shapes and commercially practical products or are deficient in physical properties desired for such shapes or products. Such polymers include homopolymers of conjugated dienes of four to six carbon atoms (e.g. butadiene, piperylene, isoprene, 2,3-dimethylbutadiene) and copolymers thereof (e.g. butadiene-isoprene, piperylene-butadiene, etc.) and copolymers of such conjugated dienes with isobutylene (butyl rubber), styrene, a hydrocarbon-substituted styrene such as methylstyrene and ethylstyrene, copolymers of butadiene and isoprene with styrene or such substituted styrenes, natural rubbers, chloroprene and copolymers thereof with butadiene and/or isoprene and/or styrene or an EPDM rubber (i.e., a rubber in which ethylene and propylene are copolymerized with an unconjugated diene of about five to 12 carbon atoms which may be dicyclopentadiene, cyclooctadiene, hexadiene-1,4, methylene norbornene, ethylidene norbornene or other non-conjugated diolefin. Block copolymers as well as other copolymers can be used. The foregoing include the so-called stereo rubbers which have been of great interest in recent years, but the properties of most of these new synthetic rubbers have not been completely satisfactory for all uses, as witness the widespread practice of blending such rubbers with natural rubber or emulsion SBR.

The stereo rubbers may be produced by polymerization of isoprene or butadiene-1,3 by means of a catalyst which is a hydrocarbon-soluble hydrocarbon derivative of an alkali metal, for example, an alkyl, alkenyl, cycloalkyl, cycloalkenyl, aryl or alkaryl derivative. Preferred linear polymers of diene monomers are prepared by polymerization of a conjugated diolefin by means of a lithium-hydrocarbon catalyst in the absence of air and moisture; copolymers of butadiene and isoprene or of either or both such diolefins with styrene or methylstyrene are produced by the same technique.

The preferred polymerization catalyst is n-butyllithium. Derivatives of the alkali metals (and particularly lithium, sodium and potassium) which are catalysts include the ethyl, butyl, amyl, hexyl, cyclohexyl, 2-ethylhexyl, n-dodecyl, n-hexadecyl, allyl, benzyl, crotonyl, cyclohexenyl, camphyl, isobornyl, phenyl, tolyl, xylyl, naphthyl and xenyl alkali metals as well as di-metal derivatives which include derivatives of ethylene, trimethylene, tetramethylene, decamethylene and octadecamethylene; 1,2-dimetalated propane, 1,4-dimetalated benzene, 1,5-dimetalated naphthalene, 1,-2-dimetalated-1,3-(diphenyl) propane, etc. The polymerizations are usually carried out at atmospheric pressure, but pressures greater and less than atmospheric may be employed. The reaction is advantageously carried out in a hydrocarbon compound, preferably a nonether and usually pentane or hexane, usually at an elevated temperature below the temperature of the boiling point of the solvent, but higher temperatures may be used and temperatures as low as −70° C. or lower may be employed. A small amount of the catalyst is all that is required, and usually from about 0.001 to about 0.5 gram of catalyst will be employed for each 100 parts of the monomer. Such linear polymers are characterized by high 1,4-content (85–95 percent of polymer derived from butadiene or isoprene), when produced in a hydrocarbon solvent. They are characterized by high linearity and narrow molecular weight distribution. The vulcanizates of such polymers are characterized by excellent physical properties, including high resiliency, low hysteresis, excellent resistance to abrasion, low running temperatures and excellent flexibility and retention of other good physical properties at extremely low temperatures typical of the Arctic in winter, all in comparison with standard emulsion polymerizates, such as commercial SBR. However, such lithium-catalyzed polymers are more difficult to process in standard rubber equipment, such as banbury mixers, mills and tubers, as compared to natural rubber and conventional (emulsion) SBR, so that they are usually mixed with natural rubber and/or SBR for commercial use. Certain of such polymers produced by lithium catalysts also possess undesirable cold-flow properties.

There are other diene polymers produced by polymerization of butadiene and/or isoprene with or without other monomers, e.g., styrene, etc., by means of other catalysts. Polymers of lower 1,4-content are produced by lithium catalysts in the presence of Lewis bases. All such diene polymers may be treated by the process of this invention.

It is an object of the invention to overcome the disadvantages of any such polymers of diene monomers, to provide novel branched polymers of high molecular weight having unexpectedly improved properties and to provide a novel method of making the novel polymers.

The polymers used in the invention are rubbers. Often they are liquid rubbers (having molecular weights of 1,000 to 30,000) or soft rubbers (having average molecular weights up to about 300,000), but useful results are obtained with polymers of higher molecular weights (as high as about 2,000,000). Rubbery products are obtained by joining polymers of such lower molecular weights.

In accordance with the invention, the polymer treated is a live polymer, i.e., it has one or more "live ends." A relatively low molecular weight live polymer of a diene monomer or copolymer derived at least in part from a diene monomer, is reacted with a joining agent which comprises a saturated or unsaturated, straight- or branched-chain or cyclo-containing aliphatic hydrocarbon which includes one to 20 or 50 or more carbon atoms per molecule and three or four halogens attached to a terminal carbon atom. The joining agent may comprise other electron-withdrawing groups. Such electron-withdrawing groups may or may not enter into the joining reaction. Such electron-withdrawing groups include ketone, aldehyde, ether, hydroxy, oxide, nitro-vinyl, ester, anhydride, amine, acid, thio, sulfonate, sulfide and unsaturated, etc. groups. The halogens of the joining agent may be fluorine, chlorine, bromine and/or iodine or mixed halogens.

The process of the invention includes reactions of one or more such polymers, with one or more of the halogen-containing joining reagents of this invention. The process of the invention is carried out at any temperature at which appreciable reaction occurs, generally in the range of −75° C. to 275° C. and preferably in the range of 0° C. to 150° C. The reaction can be carried out under reduced pressure, atmospheric pressure or at super-atmospheric pressures. Especially when the reaction is conducted in a volatile solvent or solvent mixture containing a volatile fraction, superatmospheric pressures are convenient to allow use of reaction temperatures above those to which the reaction would be confined at atmospheric pressure.

In the reaction of the invention there is normally utilized sufficient live polymer to provide from 0.01 to 10 and preferably 0.1 to 1.0 equivalent of alkali metal per atom of halogen contained in the halogen-containing compound. The mechanisms by which the reaction of the invention increases molecular weights of polymers is not known but may involve formation of radicals of which the halogen-containing compounds are precursors.

The joining agent may comprise a single carbon atom, such as chloroform or carbon tetrachloride, or a corresponding bromide or fluoride, or it may be a higher molecular weight compound such as 1,1,1-trichloropentane, 1,1,1-tribromopentane, 1,1,1-trichloropropane, 1,1,1-trichloro-n-butane, 1,1,1-trichloro-2-methylpropane, 1,1,1-trichloro-n-hexane, cyclohexylmethyl trichloride, 1,2-dichloro-4,4,4-tribromo butane, 1,1,1-triiodo-2-methylpropane, 1,1,1-tribromo-n-hexane, bis(3,3,3-trifluoropropyl) ether, 1,1,1-trichloro-3,7-decadiene, bis(5,5,5-triiodomayl) ether, bis(2,2,2-trichloroethyl) ether, etc.

The joining agent is added to the live polymer or copolymer, usually in solution. It is added to the reaction mixture after substantial completion of the polymerization reaction.

The novel polymers produced by the invention from polymers produced with hydrocarbon-lithium catalysts are characterized by improved processing properties, in comparison with polymers which have not been reacted in accordance with the invention or in comparison with similar polymers produced by other catalysts, such as Ziegler catalysts, etc., and having molecular weights comparable to those of the novel polymers. The novel polymers are rubbery and behave in rubber mills, banbury mixers and extruders as satisfactorily as do emulsion polymers of the conventional SBR types. The novel rubbery polymers are readily utilized in practical rubber compounds without admixture of natural rubber or conventional SBR, although such other rubbers can be mixed with the novel polymers if desired.

The novel polymers have higher average molecular weights, normally averaging 20 per cent to several hundred per cent higher than the average molecular weight of the polymer before reaction in accordance with the invention. The novel polymers are highly branched. They are solids with reduced (or no) tendency to coldflow and present no packaging or shipping problems. The novel rubbery polymers can be extensively diluted with oil (as with 37.5 parts oil per 100 parts polymer) without objectionable cold-flow.

The novel rubbery polymers provide vulcanizates having higher moduli than comparable vulcanizates of comparable prior art polymers. This property enhances the value of the novel polymers for many industrial uses, and especially in tire treads and carcass compositions. Vulcanizates of the novel polymers produced from the stereo synthetic rubbers also, surprisingly, possess the high resilience, high efficiency, low running temperature, high dynamic modulus and low internal friction properties characterizing the starting polymers, and hence are much superior in these respects to vulcanizates of conventional emulsion polymers.

The process of the invention increases the molecular weights of polymers and reduces linearity, producing branching and cross-linking; it can be utilized, if desired to cross-link a polymer to a stage where the novel polymer displays vulcanizate properties. Such novel "vulcanizates" have advantages because the cross-links in their structures do not involve sulfur or oxygen linkages but carbon-to-carbon cross-links.

Figure 2:
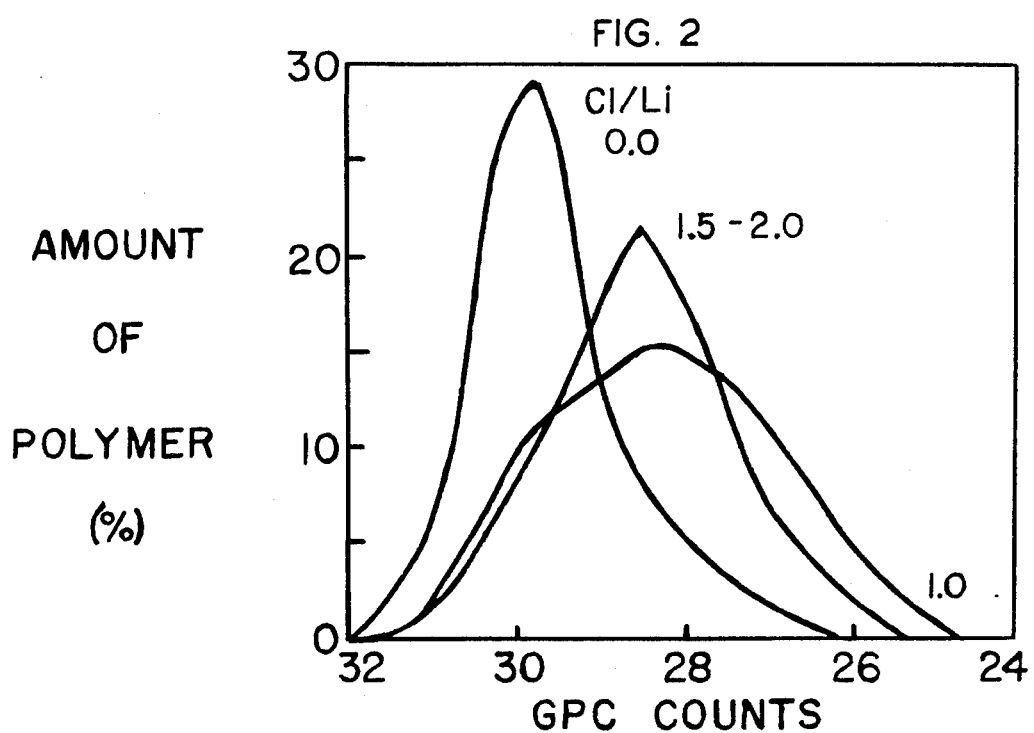

FIGS. 1 and 2 are gel-permeation chromatograph (G.P.C.) curves showing the effect of joining with carbon tetrachloride as will be explained in connection with Example 1.

The invention is illustrated by the following examples, in which parts are expressed by weight unless otherwise indicated.

EXAMPLE 1

FIG. 1 is a series of curves obtained by gel permeation chromatography (G.P.C.), using an instrument made by Water Associates designed to determine the molecular weights of polymers. The test was made on live polybutadiene cement to which carbon tetrachloride was added, in increments. The abscissae of the various curves show the per cent amount of polymer in the compositions having the represented G.P.C. counts.

Before adding the carbon tetrachloride, the G.P.C. curve shows narrow molecular weight distribution and a peak height at 29. Adding one chlorine per lithium (0.56 on the curve) the molecular weight distribution was broadened and the peak shifted to the right. This is a relatively straight-chain polymer. When more carbon tetrachloride was added in the amount of 1.00 to 1.50 chlorine per lithium (the ratio of chlorine to lithium), the peak of the curve shifted further to the right, appearing at 27 G.P.C. counts, and the curve shows still broader molecular weight distribution.

FIG. 2 is a similar series of curves comparing the effects of polymer which was not being joined, with the effect of using CCl$_4$, at a chlorine to lithium ration of one, adding all of the CCl$_4$ at one time, and also the effect of using 1.5 and 2.0 chlorine to lithium ratios, adding all of the CCl$_4$ at one time. The joined polymer resulting from the latter, showed a G.P.C. peak height at 28, and a broader molecular weight distribution than that of the control, indicating that additional carbon tetrachloride indeed caused joining of the polybutadiene polymers to give a higher molecular weight joined material.

TABLE I

Weight Fraction ($W_c$) of Joined Polybutadiene

| Cl/Li | $M_n$ | DIMER $W_2$ | TRIMER $W_3$ |
|---|---|---|---|
| 0.00 | 90,500 | 0.000 | 0.000 |
| 0.56 | 114,000 | 0.412 | 0.309 |
| 1.00 | 152,000 | 0.808 | 0.606 |
| 1.25 | 168,000 | 0.922 | 0.692 |
| 1.50 | 163,000 | 0.894 | 0.671 |

This table shows the weight fraction ($W_c$) of joined polybutadiene in which the joining agent was carbon tetrachloride. Column 1 gives the ratio of chlorine to lithium used, which is the same as that used in FIGS. 1 and 2. Column 2 gives the molecular weight of the uncoupled polymers. Column 3 gives the per cent of dimers formed, and column 4 gives the per cent of trimers formed. These figures were determined from the G.P.C. curves. The molecular weight of the uncoupled polymer $M_n$ at the chlorine to lithium ratio of 0 was 90,500. When the chlorine to lithium ratio was 1.0, the $M_n$ value was 152,000 and the per cents of dimers and trimers found was .808 and .606. This table points out that carbon tetrachloride used as joining agent indeed increases the molecular weight and broadens it.

EXAMPLE 2

Five glass beverage bottles were used as pressure reaction vessels. Each bottle was charged with 200 ml. of a hexane solution containing 30 grams of butadiene-1,3. To each bottle was added 4.0 ml. of a n-butyllithium solution in hexane containing 0.005 gram of carbon-bound lithium per ml. of solution. Each bottle was tightly sealed and placed for two hours in a polymerization water bath maintained at 50° C., the contents of each bottle being agitated by movement of the bottles in the bath in a conventional manner. The bottles were removed from the 50° C. bath and varying amounts of a hexane solution containing 0.002 gram of carbon tetrachloride per ml. of solution were added to the bottles. Then the bottles were placed in a water bath maintained at 70° C. and moved therein in a conventional manner for 16 hours to allow for reaction between the live polymer and carbon tetrachloride. The contents of each bottle were coagulated by mixing with methanol, the rubbery polymer in each case was separated and dried, and then Williams plasticity measurements were made on each polymer. Results are shown in Table II, in which the control polymer is designated Polymer 1A, and Polymers 1B through 1E represent polymers from the bottles to which increasing amounts of carbon tetrachloride were added.

TABLE II

| Polymer | ml. CCl₄ Solution | *Williams Plasticity Hgt. in mm. after 3 min. | Height in mm. After 7.5 min. | 1.0 min. recovery after 7.5 min. load |
|---|---|---|---|---|
| 1A | 0 | 2.97 | 2.50 | 0.01 |
| 1B | 0.4 | 3.26 | 2.76 | 0.36 |
| 1C | 0.8 | 3.71 | 3.25 | 0.48 |
| 1D | 1.2 | 4.00 | 3.43 | 0.84 |
| 1E | 1.6 | 5.07 | 4.33 | 2.27 |

*In accordance with ASTM Designation: D 926-56, published in ASTM Standards on Rubber Products, pages 472-474 (1957), except that tests were made at room temperature (about 23° C.), no talc was used and recovery values are actual measurements in mm.

Table II disclosed that as the carbon tetrachloride was increased the resulting polymers showed increasing Williams plasticity values and sharply increasing recovery values, indicating that the molecular weights of the products were increasing substantially, in comparison with the starting polymer.

Live poly-2,3-dimethylbutadiene, polyisoprene, polystyrene, isoprene-styrene copolymer, isoprene-butadiene copolymer, butadiene-isoprene-styrene terepolymer, isoprene-styrene-butadiene-2,3-dimethylbutadiene, piperylene-butadiene polymer and other rubbery diene synthetics are similarly reacted with carbon tetrachloride to produce new polymers of increased molecular weight which have a broad molecular weight distribution and improved processability.

EXAMPLE 3

An autoclave of approximately 1.9 liter capacity was charged with 1322 grams of a hexane solution containing 25 percent of butadiene-1,3. The solution was stirred in the autoclave and then two 100 ml. samples (totaling 122 grams) were removed for determination of impurities reactive with butyllithium. The impurity level for the reactor containing the 1200 grams of butadiene-hexane solution was found to correspond to 0.852 millimole of butyllithium. Thereupon 58.6 ml. of a n-butyllithium solution in hexane, containing 0.073 millimole of butyllithium per ml. of solution, was added to the autoclave, providing 3.426 millimoles of butyllithium for polymerizing the 300 grams of butadiene in the autoclave, in addition to the 0.852 millimole needed to neutralize impurities. The reaction temperature was maintained at approximately 40° to 70° C. for three hours, at which time approximately 100 percent conversion of the butadiene to polybutadiene had occurred, as indicated by the fact that the reaction solution contained 25 percent total solids. A control sample of polymer solution (25 percent of the reaction mixture) was removed from the autoclave and coagulated by methanol; the polymer is designated Polymer 3A in Table III. Four increments of a hexane solution each containing 0.05 millimole of carbon tetrachloride per ml. of solution were then added to the live polymer in the autoclave at 15-minute intervals, and a sample of the reaction mixture was removed from the autoclave immediately prior to each addition of the chlorine-containing compound. A first such increment, 3.2 ml., was added immediately and after removing the 25 percent sample (control sample), and the reaction temperature then varied from 63° to 42° C. Then a second sample was taken and coagulated as before to provide Polymer 3B, and a second increment of 2.76 ml. of the chloride solution was added to the remaining reaction mixture (64.6 percent of original). A third sample was taken and coagulated as before to provide Polymer 3C, and a third increment of 1.90 ml. of the chloride solution, was added to the remaining reaction mixture (44.5 percent of original). A fourth sample was taken and coagulated as before to provide Polymer 3D, and the fourth increment (1.05 ml. of the chloride solution) was added to the remaining reaction mixture (24.4 percent of original). The reaction temperature varied between 52° and 57° C. after the second chloride increment addition, and this same reaction temperature range was maintained overnight for an additional 15 hours. The remaining reaction mixture was taken as the fifth sample, and it was coagulated by methanol as before, to provide Polymer 3E. Table III shows the properties of the five samples.

TABLE III

| *Polymer | Dilute Solution Viscosity | Mooney viscosity (ML/4/ 100°C.) | Williams Plasticity at 23° C. | |
|---|---|---|---|---|
| | | | Height in mm. after 3 minutes | 1 minute recovery after 3 minutes under load |
| 3A | 1.61 | 13 | 1.97 | 0.11 |
| 3B | 1.88 | ** | 2.54 | 0.41 |
| 3C | 2.20 | 46 | 3.78 | 0.88 |
| 3D | 2.69 | 69 | 4.83 | 3.12 |
| 3E | 2.55 | 95 | 5.57 | 3.50 |

*None of the samples contained gel.
**Not determined.

EXAMPLE 4

Butadiene-1,3 was polymerized by the procedure of Example 3. The impurity level for the reactor and contents (1190 grams) was found to be equivalent to 1.134 millimoles of butyllithium. A total of 2.9 ml. of a 1.57 molar solution (in hexane) of n-butyllithium was added to the autoclave, providing 3.419 millimoles of catalyst for polymerization. After slightly less than three hours at a reaction temperature of 46° to 57° C. the reaction solution contained 25 percent total solids, indicating 100 percent conversion to polybutadiene. Samples were taken from, and increments of carbon tetrachloride were added to, the reaction mixture of the live polymer at 30-minute intervals. Data are shown in Table IV.

TABLE IV

| polymer Sample | time (hours) | grams of sample polymer solution removed | percent of reaction mixture left | ml. of 0.05 molar chloride solution added |
|---|---|---|---|---|
| 4A | 0 | 250 | 79.0 | 0 |
| 4B | 0–0.5 | 236 | 59.2 | 7.55 |
| 4C | 0.5–1.0 | 224 | 40.3 | 4.50 |
| 4D | 1.0–2.5 | 240 | 20.2 | 1.73 |
| 4E | 2.5–17 | 240 | — | 0.87 |

Each sample of polymer solution was coagulated by methanol, and the solid polymer was dried. Molecular weight distribution (MWD) curves were obtained for the five polymer samples. The MWD curve for the control, Polymer 4A, showed a sharp peak indicating that nearly all of the material had molecular weights between about 75,000 and 250,000, the peak coming at about 115,000. The peak in the MWD curve for Polymer 4B came at about 120,000, but the curve showed a larger amount of relatively high molecular weight polymer, in the range of about 200,000 to about 800,000. The peak in the MWD curve for Polymer 4C occurred at about 200,000, with appreciable polymer in the molecular weight range of about 500,000 to about 1,000,000. The shape of the MWD curve for Polymer 4D was not much different from the shape of the curve for Polymer 4C except that the peak at the molecular weight of about 220,000 was higher, thus showing that the average molecular weight of Polymer 4D was higher than that of Polymer 4C. The MWD curve for Polymer 4E again contained the peak at about 220,000, but the curve was broader, showing larger amounts of polymer in the molecular weight range of 500,000 to about 1,500,000.

EXAMPLE 5

A substantially constant composition copolymer of butadiene and styrene, containing approximately 18 percent of styrene, was prepared in a 50-gallon (189 liter) autoclave by the procedure of British Pat. No. 994,726 or Canadian Pat. No. 769,096 or U. S. application Ser. No. 209,706 (all of which comprise substantially the same disclosure), using n-butyllithium as the polymerization catalyst and hexane as the solvent. The Mooney viscosity (ML/4/100° C.) of the copolymer (Polymer 5A) was 16. Sufficient carbon tetrachloride to provide one chlorine atom for each lithium atom added in the butyllithium polymerization catalyst was prepared in hexane solution and added to the copolymer solution in the autoclave in five increments, one-third as the first increment followed by four increments of about one-sixth each of the chloride solution. The reaction temperature during addition of the chloride solution increments and until completion of the reaction was in the range of 60° to 72° C. The reaction mixture was stirred for one hour after addition of said first increment and then a portion to provide Polymer 5B was removed from the autoclave, coagulated in methanol and dried; the Mooney viscosity (ML/4/100° C.) of Polymer 5B was 38. The second increment of the chloride solution was then added to the live polymer in the autoclave, the reaction mixture was stirred another hour, and a portion was removed to provide Polymer 5C; the Mooney viscosity (ML/4/100° C.) of Polymer 5C was 43. The third increment of the chloride mixture was then added to the live polymer, the reaction mixture was stirred for an additional hour, and a portion was removed to provide Polymer 5D; the Mooney viscosity (ML/4/100° C.) of Polymer 5D was 54. The fourth increment of the chloride solution was added to the live polymer, the reaction mixture was stirred for 70 minutes, and a portion was removed to provide Polymer 5E; the Mooney viscosity (ML/4/100° C.) of Polymer 5E was 65. The fifth and final increments of the chloride solution were then added to the live polymer, the reaction mixture was stirred for an hour, and a portion was removed to provide Polymer 5F; the Mooney viscosity (ML/4/100° C.) of Polymer 5F was 77. The MWD (Molecular Weight Distribution) curve for Polymer 5A (the control) showed a peak at 125,000 molecular weight and only a small amount of material in the molecular weight range of 250,000 to 500,000. However, the MWD curve for Polymer 5F was a much broader curve with a peak at a molecular weight of about 140,000, and a considerable portion of polymer occurred in the molecular weight range of about 250,000 to 3,000,000.

EXAMPLE 6

Example 5 was substantially repeated to produce a substantially constant composition copolymer of butadiene and styrene, also containing about 18 percent of styrene. After addition of the first three of the scheduled four increments of carbon tetrachloride solution (in hexane) to the solution of the live polymer, calculated to furnish one chlorine atom for each lithium atom in the butyllithium polymerization catalyst, a portion of the reaction mixture provided Polymer 6B with a Mooney viscosity (ML/4/100° C.) of 76, considered sufficiently high for evaluation of the polymer. Polymer 6A, the control copolymer which had not reacted with the chloride solution, provided a MWD (Molecular Weight Distribution) curve similar to the curve for Polymer 5A, except that the peak occurred at a molecular weight of 140,000. The MWD curve for Polymer 6B was broad, similar to the curve for Polymer 5F except that the peak was slightly higher; again, there was a considerable portion of polymer in the molecular weight range of about 250,000 to 3,000,000.

EXAMPLE 7

Polymer 5F of Example 5 and Polymer 6B of Example 6 were tested as raw polymers. After coagulation they were diluted with 37.5 parts per 100 parts of polymer with a commercial aromatic diluting oil, and in a tire tread composition containing about 70 parts per 100 of polymer of intermediate super abrasion furnace black (I.S.A.F.) and conventional proportions of zinc oxide, stearic acid, antioxidant, processing oil, sulfur and sulfenamide-type accelerator. One such formula comprises:

| | |
|---|---|
| Polymer | 100 parts |
| Zinc oxide | 1.4 parts |
| I.S.A.F. Carbon Black | 68 parts |
| Stearic acid | 2 parts |
| Antioxidant | 2.5 parts |
| Aromatic processing oil | 40 parts |
| Sulfur 1.7 parts | |
| Accelerator | 1.4 parts |

The tread compositions contained the same total amounts of diluting oil, whether added to oil-dilute the polymer prior to compounding, or added only during compounding. Mooney values are given in Table VII-A.

TABLE VII-A

| | ML/4/100° C. | |
|---|---|---|
| | Polymer | Tread Composition |
| Polymer 5F (undiluted) | 77 | 64 |
| Polymer 5F (oil-diluted) | 33 | 54 |
| Polymer 6B (undiluted) | 76 | 64 |
| Polymer 6B (oil-diluted) | 34 | 60 |

Williams plasticity values for the polymers shown in Table VII-A are compared in Table VII-B with like values for Control M, a substantially constant composition butadiene-styrene copolymer, containing 18 percent styrene, made according to the patent disclosure identified in Example 5 and comparable to Polymers 5A and 6A except for its higher molecular weight (50 ML/4/100° C.); and Control N, likewise comparable to polymers 5A and 6A but for a much higher molecular weight (75 ML/4/100° C.) and the fact that it was oil-diluted with 37.5 parts per 100 of polymer with the same commercial aromatic oil used to dilute Polymers 5F and 6B.

TABLE VII-B

| | Williams Plasticity at 23° C. | |
|---|---|---|
| Polymer | height in mm. After 3 minutes | 1 minute recovery After 3 minutes |
| 5F (undiluted) | 5.51 | 3.12 |
| 5F (oil-diluted) | 3.78 | 1.40 |
| 6B (undiluted) | 5.18 | 2.87 |
| 6B (oil-diluted) | 3.86 | 1.45 |
| Control m | 4.23 | 1.13 |
| Control n | 4.12 | 0.08 |

The oil-diluted Polymers 5F and 6B displayed no objectionable cold-flow properties, and the tire tread compositions made from them processed very satisfactorily in a rubber mill and an extruder. In contrast, Control N exhibited objectionable cold-flow properties and provided a tire tread composition same formula as used for Polymers 5F and 6B) having unsatisfactory processing characteristics in a rubber mill and an extruder. The vulcanizates of tread compositions made from the polymers shown in Table VII-B all displayed excellent physical properties comparable to the properties shown in patent disclosures identified in Example 5 for substantially constant composition copolymers of butadiene and styrene.

EXAMPLE 8

Butadiene-1,3 is initiated with n-butyllithium at 0° C. without the use of hydrocarbon solvent other than the butadiene-1,3, and at 30 per cent conversion carbon tetrachloride is added to the live polymer cement. The excess monomer is evaporated and the cement is coagulated in the usual manner with methanol containing a small amount of dissolved antioxidant, di-t-butyl catechol, added to stabilize the polymer. The polymer obtained has a broad molecular weight distribution and is highly branched and has an increased molecular weight in comparison to the molecular weight of polybutadiene similarly prepared in the absence of a joining agent.

Chloroform or other joining agent of this invention may be similarly used.

EXAMPLE 9

A copolymer of butadiene and styrene is prepared using n-butyllithium initiator at 50° C. During the polymerization, a sample is taken to determine the total solids value, which is related to the per cent conversion of the monomers to copolymers, and when 80 per cent of the monomers are converted to polymers a cement of chloroform is added. A copolymer of broad molecular weight distribution and large degree of branching is produced which is useful in the manufacture of tires and rubber goods.

Carbon tetrachloride and other joining agents of this invention may be similarly used.

The novel polymers can be blended with other known polymers to provide useful commercial compositions for fabrication into useful shapes and articles. The novel rubbery polymers are advantageously blended with known rubbers (e.g., natural rubber, SBR, BR, IR, IIR, CR, ISR), with or without diluting oils, for forming vulcanizates of great technical importance. The novel rubbery polymers are advantageously compounded with the known reinforcing carbon blacks to produce useful commercial stocks, which may also contain one or more additional rubbery polymer, and may also contain 5 to 100 phr (parts per 100 parts of the rubber) of diluting oil or plasticizer. Sulfur and other known vulcanizing agents for natural rubber and the commercial synthetic rubbers are useful for forming vulcanizable stocks containing a novel polymer of the invention. Known antioxidants, stabilizers and antiozonants for natural and commercial synthetic rubbers find similar utility in compositions containing the novel polymers of the invention. Known methods of mixing, forming, fabricating and curing compositions of natural and commercial synthetic rubbers are applicable to and useful with compositions containing the novel polymers of the invention. The novel polymers of the invention are especially useful in pneumatic tire tread, sidewall and carcass compositions, and the considerations of this paragraph are especially relevant to the use of the novel polymers in tires.

I claim:

1. In the process of preparing a rubbery polymer or copolymer derived at least in part from a conjugated diene by means of a lithium-based catalyst, the improvement which comprises terminating the chain growth reaction with a chain-terminating agent of the class consisting of carbon tetrachloride and chloroform and producing a polymer or copolymer of increased molecular weight distribution and a Williams plasticity recovery value of at least about 0.84.

2. The process of claim 1 in which the chain terminating agent is carbon tetrachloride.

3. The process of claim 1 in which said polymer or copolymer is polybutadiene and the chain-terminating agent is carbon tetrachloride.

4. The process of making a rubbery, higher molecular-weight polymer or copolymer which comprises joining molecules of a lower molecular-weight lithiated polymer or copolymer derived at least in part from a conjugated diene monomer after the polymerization thereof is substantially complete, by reacting same in solution with a joining agent of the class consisting of carbon tetrachloride and chloroform and producing a polymer or copolymer of increased molecular weight distribution and a Williams plasticity recovery value of at least about 0.08.

5. The process of claim 4 in which the joining agent is carbon tetrachloride.

6. The process of claim 4 in which said polymer or copolymer is polybutadiene and the chain-terminating agent is carbon tetrachloride.

* * * * *